United States Patent
Thibault

(10) Patent No.: US 6,688,758 B2
(45) Date of Patent: Feb. 10, 2004

(54) LINE GENERATOR OPTICAL APPARATUS

(75) Inventor: Simon Thibault, Sainte Foy (CA)

(73) Assignee: Institut National D'Optique, Sante-Foy (CA)

( * ) Notice: Subject to any disclaimer, the term of this patent is extended or adjusted under 35 U.S.C. 154(b) by 0 days.

(21) Appl. No.: 10/185,341

(22) Filed: Jun. 28, 2002

(65) Prior Publication Data

US 2003/0231511 A1 Dec. 18, 2003

(30) Foreign Application Priority Data

Jun. 14, 2002 (CA) ............................................. 2390781

(51) Int. Cl.[7] .............................. F21V 5/00; F21V 5/04; G02B 13/08
(52) U.S. Cl. ...................... 362/368; 362/551; 359/641; 359/668; 369/44.26; 369/112.28; 235/454; 235/462.45
(58) Field of Search ................................ 362/268, 551; 359/668, 641; 369/112.1, 44; 235/462.2, 462.21, 462.22, 454

(56) References Cited

U.S. PATENT DOCUMENTS

| | | | |
|---|---|---|---|
| 4,589,738 A | | 5/1986 | Ozaki |
| 4,754,446 A | * | 6/1988 | Reno ...................... 369/112.28 |
| 4,826,299 A | | 5/1989 | Powell |
| 4,851,978 A | * | 7/1989 | Ichihara ...................... 362/268 |
| 5,662,410 A | * | 9/1997 | Suganuma .................... 362/268 |
| 6,073,851 A | * | 6/2000 | Olmstead et al. ......... 235/462.45 |
| 6,188,481 B1 | * | 2/2001 | Kumar ........................ 356/489 |
| 6,339,504 B1 | * | 1/2002 | Oliva .......................... 359/641 |
| 6,478,452 B1 | * | 11/2002 | Richardson et al. ........ 362/268 |
| 6,494,371 B1 | * | 12/2002 | Rekow et al. ............... 235/454 |
| 6,540,145 B2 | * | 4/2003 | Gurevich et al. ....... 235/462.21 |
| 6,594,090 B2 | * | 7/2003 | Kruschwitz et al. ......... 359/707 |
| 6,611,478 B1 | * | 8/2003 | Farr ......................... 369/44.26 |

* cited by examiner

Primary Examiner—Sandra O'Shea
Assistant Examiner—James W Cranson, Jr.
(74) Attorney, Agent, or Firm—Wallenstein Wagner & Rockey, Ltd.

(57) ABSTRACT

An apparatus for generating linear patterns of light comprises a light source emitting a first light beam. An anamorphic system is positioned downstream of the light source and is adapted to receive the first light beam of the light source for concentrating the first light beam such that the first light beam would project a first linear pattern on a far field. A diffractive optical element is positioned downstream of the anamorphic system for receiving and diffusing the first light beam of the anamorphic system a plurality of second light beams. The plurality of second light beams overlap one another at least partially so as to project a second linear pattern on the far field of altered intensity with respect to the first linear pattern.

14 Claims, 6 Drawing Sheets

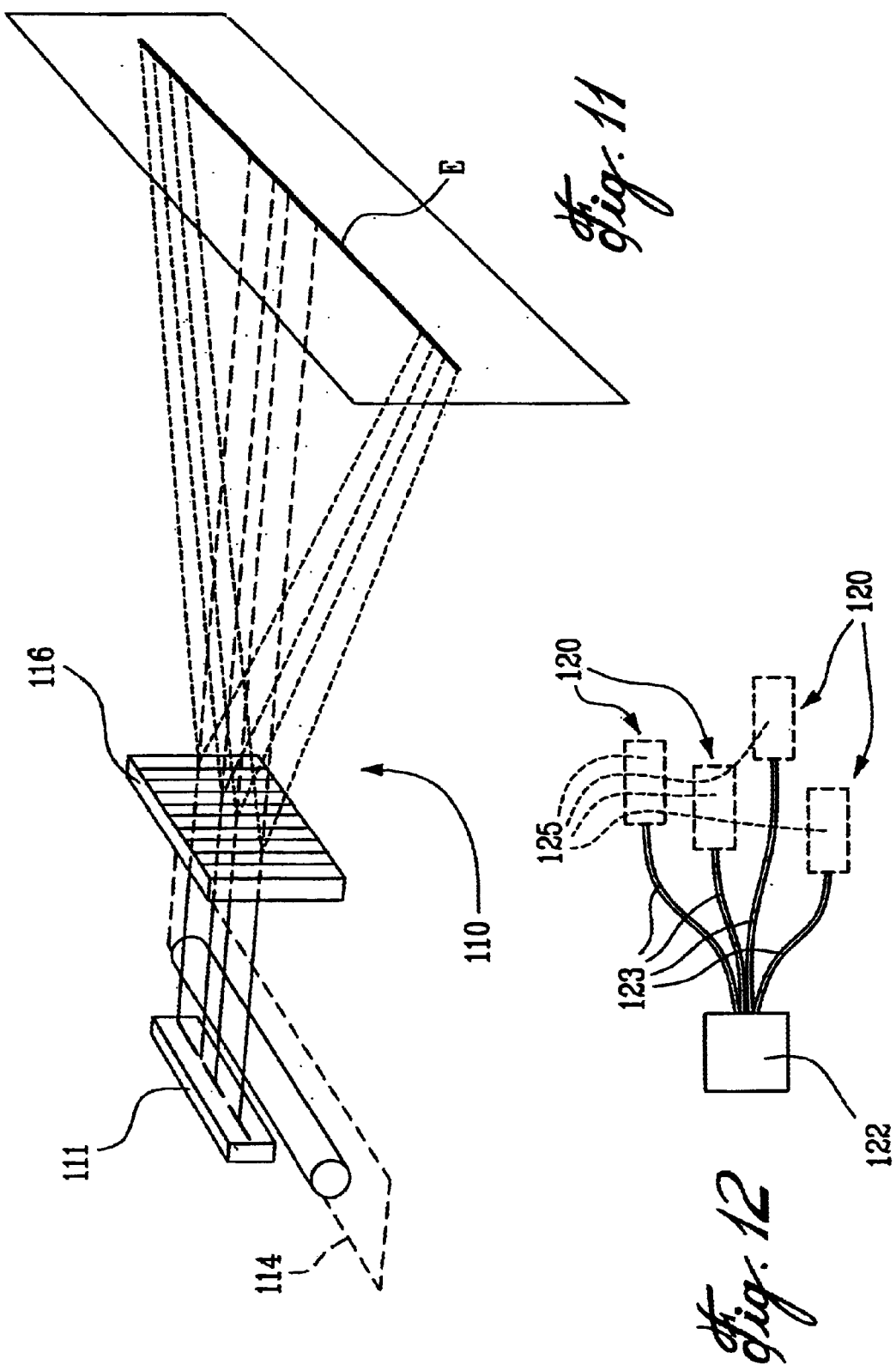

LINE GENERATOR OPTICAL APPARATUS

BACKGROUND OF THE INVENTION

1. Field of the Invention

The present invention relates to optical apparatuses and, more particularly, to optical apparatuses generating line patterns on objects.

2. Description of the Prior Art

Structured light patterns are widely used in 3D profiling systems and machine vision applications. For instance, the generation of a line of light on an object can be used to determine and digitize the shape of an object in 3D profiling systems. Line patterns are also used in helping to recognize and locate an object in an environment in machine vision applications.

The known line generators that are found on the market today use cylindrical optics to expand a light beam, such as a laser beam, in one direction to create a line of light. Lines of light generated by cylindrical optics are qualified as being Gaussian lines of light, and are characterized in that they have a bright center and fading extremities. In other words, the intensity of a Gaussian line of light fades away towards the ends of the line, as illustrated by FIG. 1, wherein x is the length coordinate and I(x) is the longitudinal intensity profile as a function of the length coordinate. The longitudinal line intensity distribution has the highest intensity in the center of the line of light, and the light intensity decreases from the center to the ends of the line of light. The decrease in light intensity the ends of the line is problematic, as the light intensity thereof eventually falls below threshold levels of devices, such as detectors, that detect the line of light, and thus the ends of the line become invisible to these devices. As another example, in 3D profiling systems, because the light intensity of lines is non-uniform, the calibration of charge-coupled devices can also become very difficult. Separate calibrations must be made for pixels in the bright central line portion and for those in the transitional line portions. Low intensity line portions at the ends of the line cannot contribute to the calibration, as they are not visible to the device.

U.S. Pat. No. 4,826,299, issued on May 2, 1989 to Powell, describes optical lenses for projecting a laser beam in a linear pattern that overcomes the limits of the Gaussian linear patterns of cylindrical optics. The lenses of U.S. Pat. No. 4,826,299, also known as Powell lenses, produce an efficient flat-field line pattern (i.e., on a flat surface) and have thereby solved prior problems associated with the Gaussian line projection of laser beams. The intensity distribution of the flat-field line pattern resulting from the use of a Powell lens is illustrated in FIG. 2, wherein x is the length coordinate and I(x) is the longitudinal intensity profile as a function of the length coordinate. The flat-field line pattern provides a high level of uniformly distributed intensity. The Powell lenses are frequently used as laser line generators for machine vision applications.

In some instances, such a high level of uniformly distributed intensity is not required. As Powell lenses represent an expensive way to get a line pattern of more uniformly distributed intensity (i.e., the production of Powell lenses requires high-precision equipment), the Powell lenses represent an expensive solution, especially when such a high level of uniformly distributed intensity is not required. Furthermore, Powell lenses have been limited to uses where the light source is a well collimated diffraction-limited light beam, such as a laser beam, and this further increases the cost of such line generators. Extended sources of light have not been used with Powell lenses.

SUMMARY OF THE INVENTION

It is therefore an aim of the present invention to provide a new apparatus and method for generating line patterns of light.

Therefore, in accordance with the present invention, there is provided an apparatus for generating linear patterns of light, comprising at least one light source emitting a first light beam, an anamorphic system positioned downstream of the light source and adapted to receive the first light beam of the light source for concentrating the first light beam such that the first light beam would project a first linear pattern on a far field, and at least one diffractive optical element positioned downstream of the anamorphic system for receiving and diffusing the first light beam of the anamorphic system in at least two second light beams, the two second light beams overlapping one another at least partially so as to project a second linear pattern on the far field of altered intensity with respect to the first linear pattern.

Also in accordance with the present invention, there is provided a method for generating linear patterns of light, comprising the steps of: i) emitting a first light beam; ii) collimating the first light beam in at least a longitudinal dimension; and iii) diffusing the first light beam into at least two second beams, said at least two second beams at least partially overlapping one another to project a linear pattern on a far field.

Further in accordance with the present invention, there is provided a system of apparatuses for generating linear patterns of light, comprising at least one light source emitting a light signal, at least two optical fibers each emitting a first light beam to one of the apparatuses, each apparatus comprising an anamorphic system positioned downstream of a respective one of the optical fibers and adapted to receive the first light beam of the respective one of the optical fibers for concentrating the first light beam such that the first light beam would project a first linear pattern on a far field, and at least one diffractive optical element positioned downstream of the anamorphic system for receiving and diffusing the first light beam of the anamorphic system in at least two second light beams, the two second light beams overlapping one another at least partially so as to project a second linear pattern on the far field of altered intensity with respect to the first linear pattern.

BRIEF DESCRIPTION OF THE DRAWINGS

Having thus generally described the nature of the invention, reference will now be made to the accompanying drawings, showing by way of illustration a preferred embodiment thereof and in which:

FIG. 11 is a perspective view of a line generator optical apparatus in accordance with yet another embodiment of the present invention; and FIG. 12 is a schematic view of a networked light source for a plurality of the line generator optical apparatus of the present invention.

DESCRIPTION OF THE PREFERRED EMBODIMENTS

Figure 3:
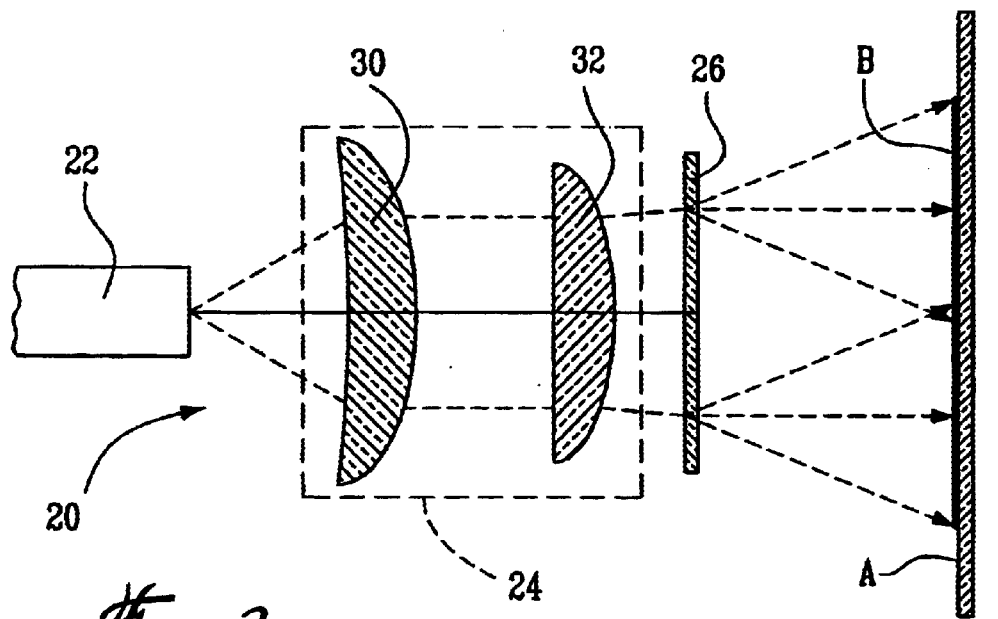
FIG. 3 is a schematic view of a line generator optical apparatus in accordance with the present invention.

Referring to the drawings, and more particularly to FIG. 3, a line generator optical apparatus in accordance with the present invention is generally shown at 20. The line generator optical apparatus 20 comprises a light source 22, an anamorphic optical device 24, and a diffractive optical element 26. The anamorphic optical device 24 of the line generator optical apparatus 20 of the embodiment illustrated in FIG. 3 includes a spherical lens 30 and a cylindrical lens 32. In further embodiments of the present invention, alternatives will be given for the anamorphic optical device 24.

Figure 1:
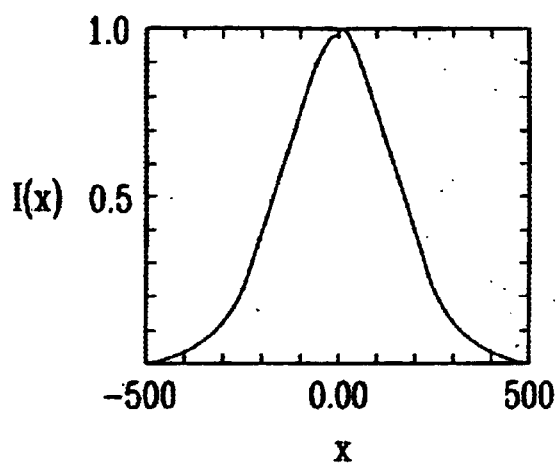
FIG. 1 is a graph illustrating a conventional Gaussian longitudinal line intensity distribution in accordance with the prior art.
Figure 2:
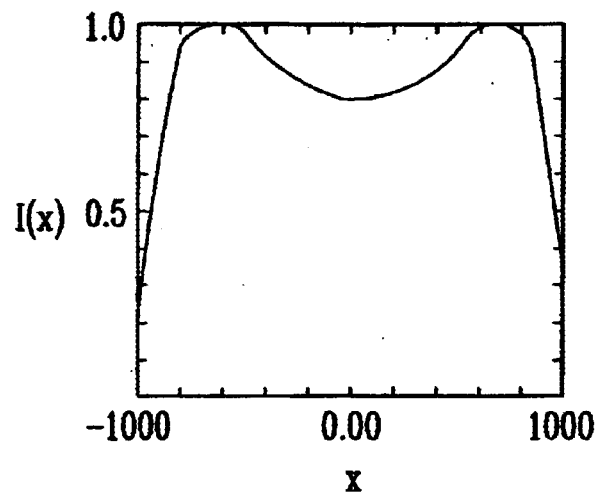
FIG. 2 is a graph illustrating a conventional longitudinal line intensity distribution of a Powell lens of the prior art.

The light source 22 is preferably a multimode optical fiber, although an extended source including generally any light source such as a typical domestic-use incandescent light can be used. An optical signal, in the form of a light beam, is outputted from the light source 22 and passes through the anamorphic optical device 24. The anamorphic optical device 24 generates a master beam that would create a master line if it was projected on a target plane A (i.e., a far field). The intensity profile of the master line outputted from the anamorphic optical device 24 on a target plane is generally Gaussian in both the longitudinal and lateral directions thereof, i.e., in length and width, respectively. Therefore, the master line intensity profile has a curve similar in shape to the curve depicted in FIG. 1 of the prior art.

In the embodiment of FIG. 3, the output light beam of the light source 22 is passed through a first optical element, namely, the spherical lens 30, such that the width of the output light beam is collimated or imaged. After being collimated or imaged in width by the spherical lens 30, the light passes through a second optical element, namely, the cylindrical lens 32, such that the length of the light line is collimated or adjusted to create the master beam, which is then directed to the diffractive optical element 26.

The master beam passes through the diffractive optical element 26, which will generate "n" copies of the master beam (e.g., n=3 for FIG. 3), referred to as parent beams. Each one of the parent beams is modulated by the diffractive efficiency associated with it. When the parent beams illuminate the target plate A, one parent line B will be generated thereon. The parent line appearing on the target plane A is the summation of each parent beam. Accordingly, the diffractive optical element 26 transforms the master beam, which would generate the master line of Gaussian intensity distribution on the target plane A, into "n" parent beams that will generate the parent line B on the target plane A.

Accordingly, the line generator optical apparatus 20 of the present invention expands a light beam in two directions to project a beam that will generate a line of predefined intensity, length and width. More precisely, the master line width is determined by standard optical design procedure for collimating or imaging purposes. The master line length is generated by cylindrical optics that can be calculated in a standard way using an optical design software. Other configurations for the anamorphic optical device 24 that will serve the same function include spherical lens or lens group and cylindrical lens or lens group, reflective spherical mirror with cylindrical mirror, diffractive lens, aspherical lens, and combinations of any of these optical elements. For instance, referring to FIG. 4, the line generator optical apparatus 20' of the present invention has an anamorphic optical device 24' composed of two spherical lenses 40 and one cylindrical lens 42, as well as a light source. U.S. Pat. No. 4,589,738, issued on May 20, 1986 to Ozaki, also proposes various optical arrangements that can perform Gaussian line profiles.

Now that the line generator optical apparatus 20 has been described structurally, a study of the longitudinal light intensity distribution thereof follows. The design of the line generator optical apparatus 20 is based on the Gaussian beam profile of the master beam that can be expressed by:

$$I(x) = I_0 \cdot e^{-\left(\frac{x^2}{w_0^2}\right)}$$

where $I(x)$ is the longitudinal intensity profile along the x coordinate (length coordinate), $I_0$ is the intensity at x=0 of the master line (center) and $w_0$ is the half of the master line length defined by an intensity value of $I_0/e^2$ that defines the well known waist of a Gaussian shape.

The design is also based on the following well known grating equation and its small angle approximation:

$$\sin\theta \approx \theta \approx \frac{M \cdot \lambda}{\Lambda}$$

where M is the diffraction order, $\lambda$ is the wavelength of the light emitted by the light source 22, and $\Lambda$ is the period of the diffractive optical element 26.

Using the above equation, we can describe the longitudinal line profile by:

$$I_T(x) = \sum_{m=-\infty}^{\infty} \eta_m \cdot I_0 \cdot e^{-\left(\frac{\left(x - \frac{l \cdot M \cdot \lambda}{\Lambda}\right)^2}{w_0^2}\right)}$$

where 1 is the distance between the diffractive optical element and an image plane, i.e., the target plane, and $\eta_m$ is the diffraction efficiency associated with the $m^{th}$ order of diffraction produced by the diffractive optical element.

Figure 4:
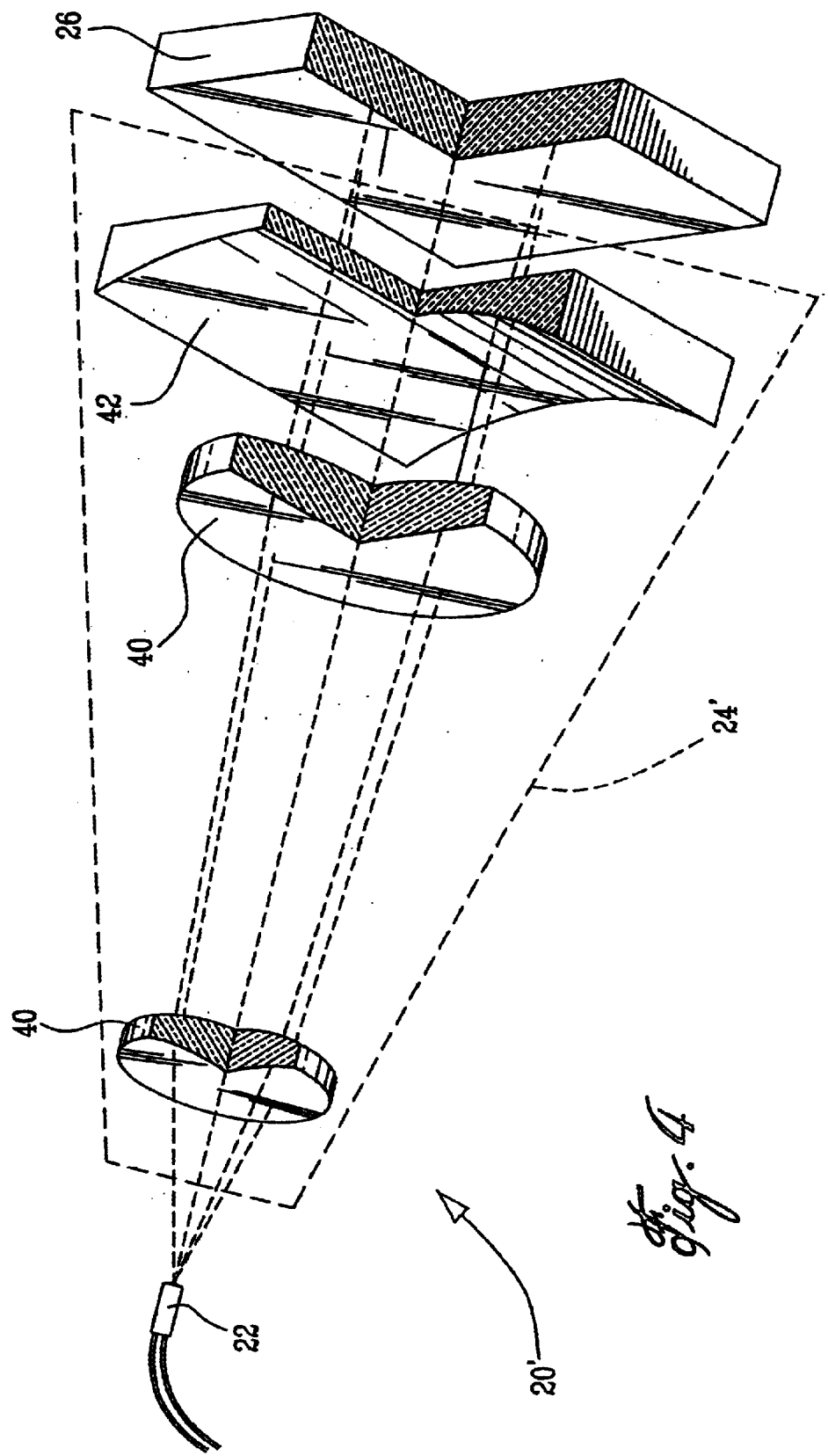
FIG. 4 is a perspective view, partially sectioned, of a variant of the line generator optical apparatus.

In applying these equations to the line generator optical apparatus 20 of FIG. 4, the light source 22 emits light having a wavelength of 800 nm, and is a multimode fiber with a core diameter of 100 μm with a numerical aperture of 0.22. The two spherical lenses 40 are used to image the object source (the optical fiber end) in an image plane, i.e., the target plane, at a distance of about 1.88 m. The magnification is about 40 times and thus creates an image having a line width of 4 mm in the image plane. The third optical element, namely the cylindrical lens 42, is a negative cylindrical lens of −150 mm focal length. The cylindrical lens 42 expands the light beam only in the longitudinal dimension in order to produce a Gaussian line profile in the image plane. The length ($w_0$) of the Gaussian line is about 91.4 mm.

The last optical element is the diffractive optical element 26, which is a simple binary phase grating with a period Λ of 13 μm designed and which is built to produce a diffraction efficiency of 15% in the order 0 and of 35% in the order +/−1 (i.e., the order 0 is center of the linear pattern, and the orders +/−1 are the centers of the parent lines).

$\eta_0 = 0.15, \eta_{-1} = 0.35, \eta_{+1} = 0.35$.

Figure 5:
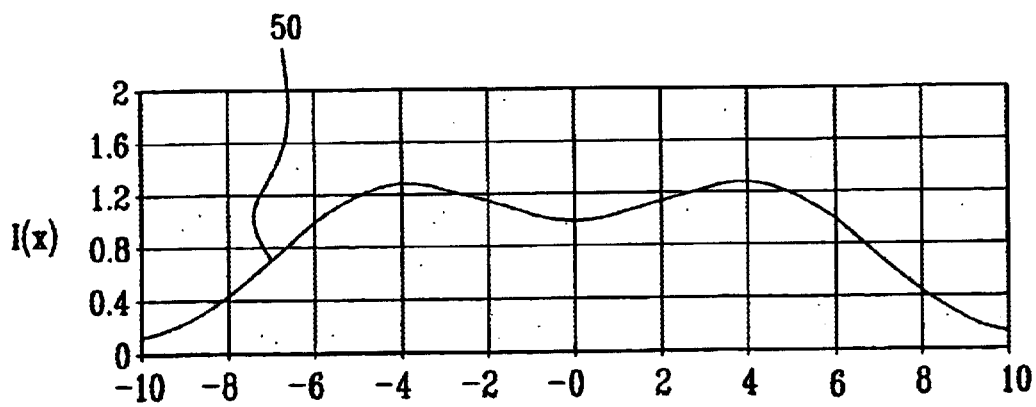
FIG. 5 is a graph illustrating a longitudinal line intensity distribution of the line generator optical apparatus with a target plane at 1.88 m.
Figure 6:
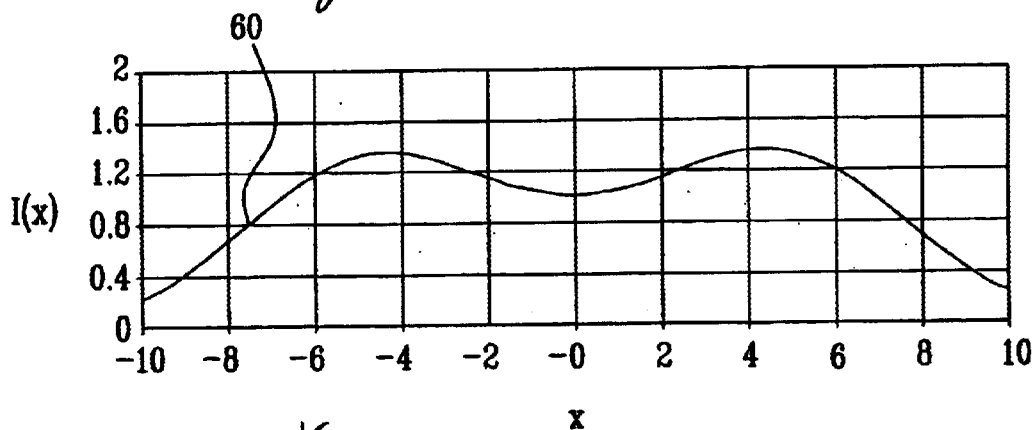
FIG. 6 is a graph illustrating the longitudinal line intensity distribution of the line generator optical apparatus with the target plane at 2.03 m.
Figure 7:
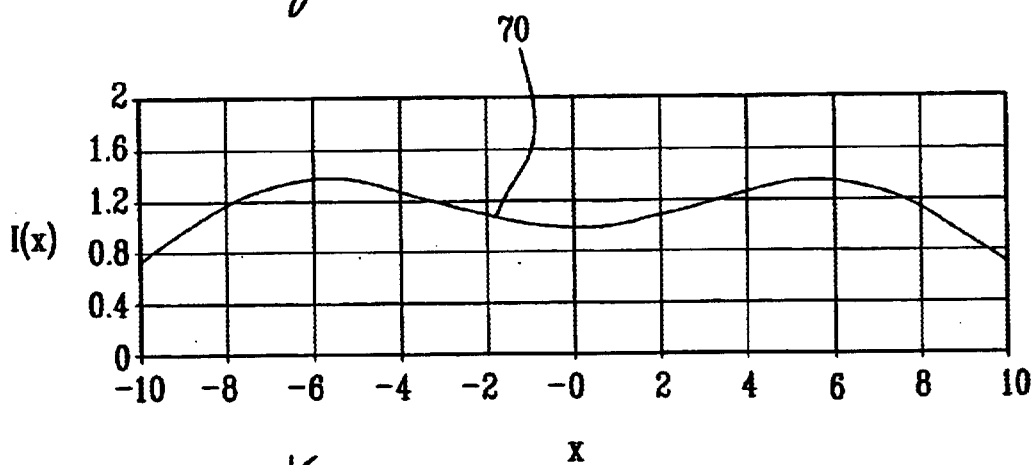
FIG. 7 is a graph illustrating the longitudinal line intensity distribution of the line generator optical apparatus with the target plane at 2.69 m.
Figure 8:
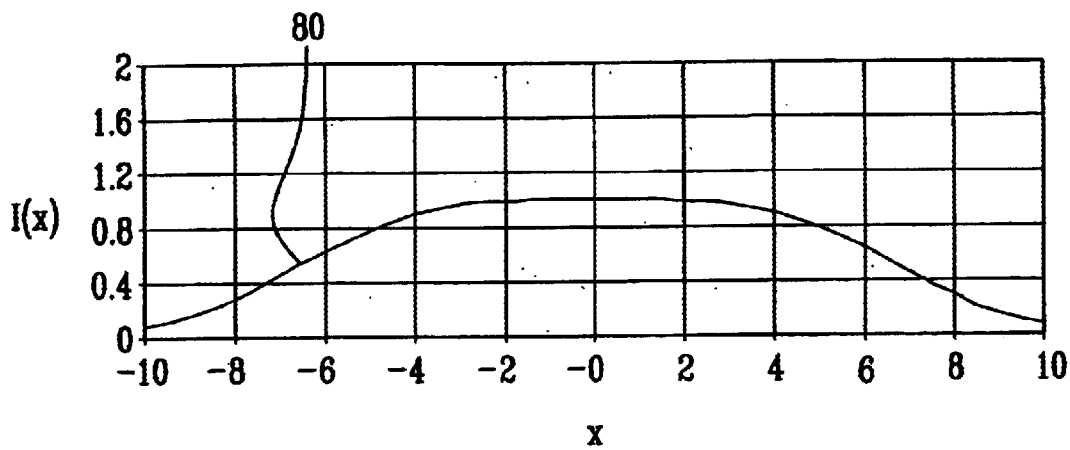
FIG. 8 is a graph illustrating a longitudinal line intensity distribution of the line generator optical apparatus with a diffractive efficiency at 30% in the order of b and ±1.
Figure 9:
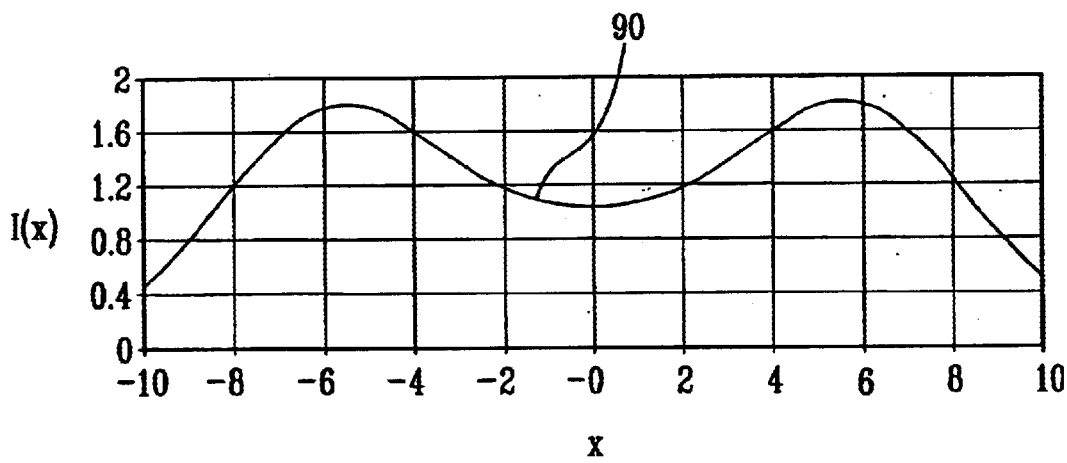
FIG. 9 is a graph illustrating a longitudinal line intensity distribution of the line generator optical apparatus with a diffractive optical element having a period of 10 μm.

With these values and formulas, a longitudinal line intensity distribution 50 for the line generator optical apparatus 20 is illustrated in FIG. 5. FIGS. 6 and 7 illustrate at 60 and 70, respectively, longitudinal line intensity distributions at distances of 2.03 m and 2.69 m, respectively. FIG. 8 shows a longitudinal line intensity distribution 80 at 1.88 m, yet with a different diffractive optical element 26 with the same period that produces a diffraction efficiency of 30% in the order of diffraction 0 and +/−1. FIG. 9 depicts a longitudinal line intensity distribution 90 at 1.88 m with a different diffractive optical element 26 that produces a diffraction efficiency of 15% in the order 0 and of 35% in the order +/−1 but with a 10 μm period.

Therefore, the longitudinal line intensity distributions illustrated in FIGS. 5, 6, 7 and 9 demonstrate generally a flat-top curve, having a larger central high-intensity portion than Gaussian line profiles. As the diffraction efficiency is greater in the order of ±1 than in the center (at 0), it creates the camel-like shape of the curve. In FIG. 8, the diffractive efficiency is the same in orders of ±1 and in the center, and this gives more of a plateau shape. Accordingly, the line intensity distribution of the line generator optical apparatus 20 is predictable. The line intensity distribution can thus be set as a function of the requirements of the devices with which it will be used.

Figure 10:
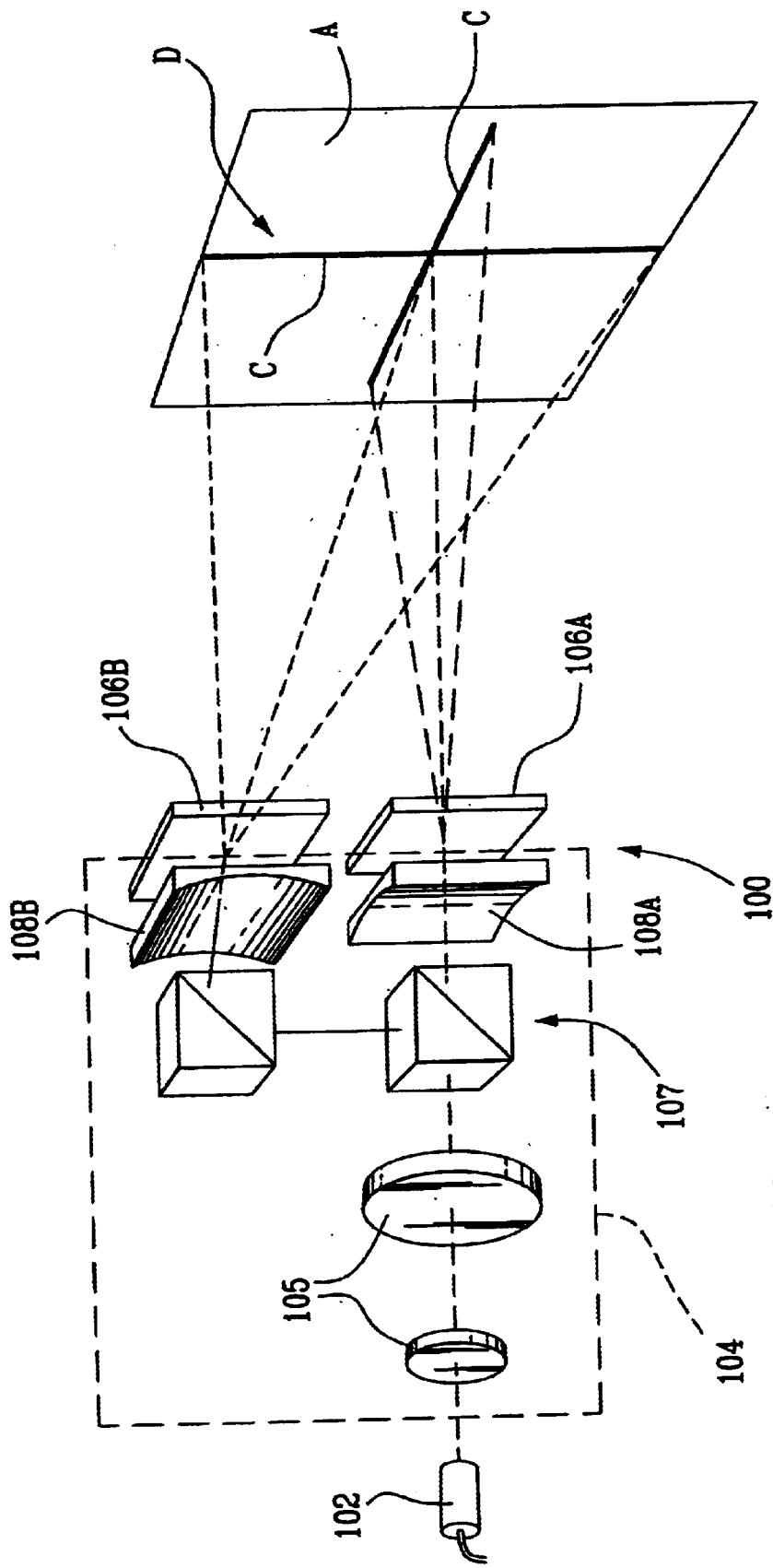
FIG. 10 is a perspective view of a line generator optical apparatus in accordance with another embodiment of the present invention.

FIG. 10 illustrates a line generator optical apparatus 100 in accordance with another embodiment of the present invention. The line generator optical apparatus 100 generates a light cross D in the target plane A. The line generator optical apparatus 100 has, similarly to the line generator optical apparatus 20, a light source 102 and an anamorphic device 104, but it has two diffractive optical elements, namely 106A and 106B. The anamorphic device 104 consists of a pair of spherical lenses 105, a beam splitter 107, and two different cylindrical lenses 108A and 108B. After passing through the spherical lenses 105, the light beam is split into two beams by the beam-splitter 107. These two beams each pass in a corresponding one of the two different cylindrical lenses 108A and 108B to form two separated master beams. The cylindrical lenses 108A and 108B have orthogonal power and would form in the target plane A two orthogonal master lines (not shown). The master beams pass through the two diffractive optical elements 106A and 106B to generate "n" parent beams. These parent beams create two parent lines C in the form of a cross in the target plane A. The diffractive optical elements 106A and 106B can be the same in each route of the line generator optical apparatus 100, with a rotation of 90 degrees to spread the light in the proper direction.

Referring to FIG. 11, a line generator optical apparatus 110 in accordance with another embodiment of the present invention generates a high-power laser line E using a multiple laser diode source 111. To produce a high-power laser line, it is desirable to add the power of multiple laser diodes in order to get adequate power. Using Powell lenses, each individual laser diode would be considered separately. This implies that a number of Powell lenses equal to the number of laser diodes would be required, with each Powell lens being adequately aligned. Also, each emitter would require to be collimated in both axes by an anamorphic multi-element optical system. In the line generator optical apparatus 110 of the present invention, each laser diode 111 will use an anamorphic multi-element optical apparatus 114 (in this case, a cylindrical lens) in order to generate a same master beam. A diffractive optical element 116 is placed in front of the anamorphic multi-element optical apparatus 114 in order to generate the laser line E. The longitudinal intensity profile of the laser line E is described by the summation of each individual line profile produced by individual laser diodes.

The line generator optical apparatuses of the present invention produce lines having generally flat-top intensity distributions (i.e., as shown in FIGS. 5 to 9), but yet remain a cost-effective solution, as all elements forming the line generator optical apparatuses of the present invention are known. Furthermore, the line generator optical apparatuses of the present invention may be used with a broad variety of sources of light. In the case of the Powell lenses, each Powell lens needs a well collimated light source, such as a laser, and results in an expensive solution when many line generators are required. As shown in FIG. 12, a plurality of line generator optical apparatuses 120 share one light source 122 through a network of multicore optical fibers 123 extending to each set of optics 125 (i.e., the combination of anamorphic optical device and diffractive optical element) of the line generator optical apparatuses 120.

I claim:

1. An apparatus for generating linear patterns of light, comprising at least one light source emitting a first light beam, an anamorphic system positioned downstream of the light source and adapted to receive the first light beam of the light source for concentrating the first light beam such that the first light beam would project a first linear pattern on a far field, and at least one diffractive optical element positioned downstream of the anamorphic system for receiving and diffusing the first light beam of the anamorphic system in at least two second light beams, the at least two second light beams overlapping one another at least partially so as to project a second linear pattern on the far field of altered intensity with respect to the first linear pattern.

2. The apparatus according to claim 1, wherein the second linear pattern has a non-Gaussian longitudinal light intensity profile.

3. The apparatus according to claim 1, wherein the anamorphic system includes at least one cylindrical lens to adjust a length dimension of the first light beam.

4. The apparatus according to claim 3, wherein the anamorphic system has at least one spherical lens to adjust a width dimension of the first light beam.

5. The apparatus according to claim 4, wherein there are provided two of the diffractive optical element and wherein the anamorphic system has a beam splitter and two cylindrical lenses, the beam splitter separating the first beam into two first light beams each adapted to pass through a respective one of the two cylindrical lenses, the cylindrical lenses being positioned generally at a 90° offset with respect to one another, so as to each concentrate a respective one of the first light beams on a respective one of the two diffractive optical elements to project a cross-shaped second linear pattern on the far field.

6. The apparatus according to claim 1, wherein the light source is a multimode fiber.

7. The apparatus according to claim 1, comprising a plurality of light sources such that the first light beam is a summation of light beams produced by each one of the light sources and at least partly overlapping one another to project the second linear pattern with enhanced intensity on the far field.

8. The apparatus according to claim 7, wherein the light sources are laser diodes.

9. A system of apparatuses for generating linear patterns of light, comprising at least one light source emitting a light signal, at least two optical fibers each emitting a first light beam to one of the apparatuses, each apparatus comprising an anamorphic system positioned downstream of a respective one of the optical fibers and adapted to receive the first light beam of the respective one of the optical fibers for concentrating the first light beam such that the first light beam would project a first linear pattern on a far field, and at least one diffractive optical element positioned downstream of the anamorphic system for receiving and diffusing the first light beam of the anamorphic system in at least two second light beams, the two second light beams overlapping one another at least partially so as to project a second linear pattern on the far field of altered intensity with respect to the first linear pattern.

10. The system according to claim 9, wherein the optical fiber is a multimode optical fiber.

11. The system according to claim 9, wherein the second linear pattern has a non-Gaussian longitudinal light intensity profile.

12. The system according to claim 9, wherein the anamorphic system includes at least one cylindrical lens to collimate a length dimension of the first light beam.

13. The system according to claim 12, wherein the anamorphic system has at least one spherical lens to collimate a width dimension of the first light beam.

14. The system according to claim 13, wherein there are provided two of the diffractive optical element and wherein the anamorphic system has a beam splitter and two cylindrical lenses, the beam splitter separating the first beam into two first light beams each adapted to pass through a respective one of the two cylindrical lenses, the cylindrical lenses being positioned generally at a 90° offset with respect to one another, so as to each concentrate a respective one of the first light beams on a respective one of the two diffractive optical elements to project a cross-shaped second linear pattern on the far field.

* * * * *

UNITED STATES PATENT AND TRADEMARK OFFICE
CERTIFICATE OF CORRECTION

PATENT NO. : 6,688,758 B2
DATED : February 10, 2004
INVENTOR(S) : Simon Thibault It is certified that error appears in the above-identified patent and that said Letters Patent is hereby corrected as shown below:

Column 3,
Line 6, after "in the order of" please delete "b" and insert -- 0 -- therefore.

Signed and Sealed this

First Day of February, 2005

JON W. DUDAS
*Director of the United States Patent and Trademark Office*